Sept. 26, 1933.  C. HEUZE  1,928,254
APPARATUS FOR ANNEALING CONTINUOUS SHEETS OF GLASS
Filed Oct. 31, 1927
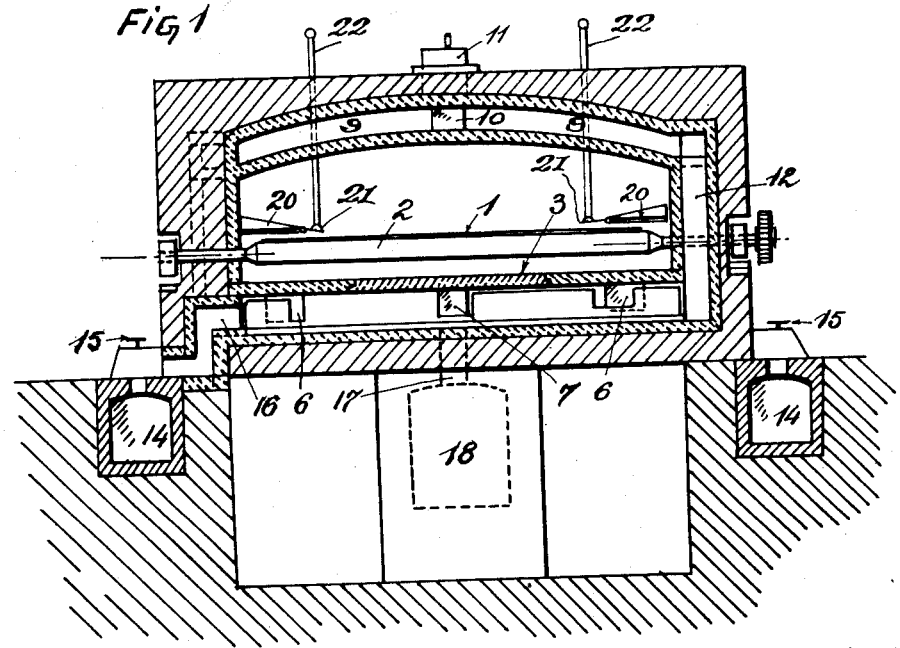
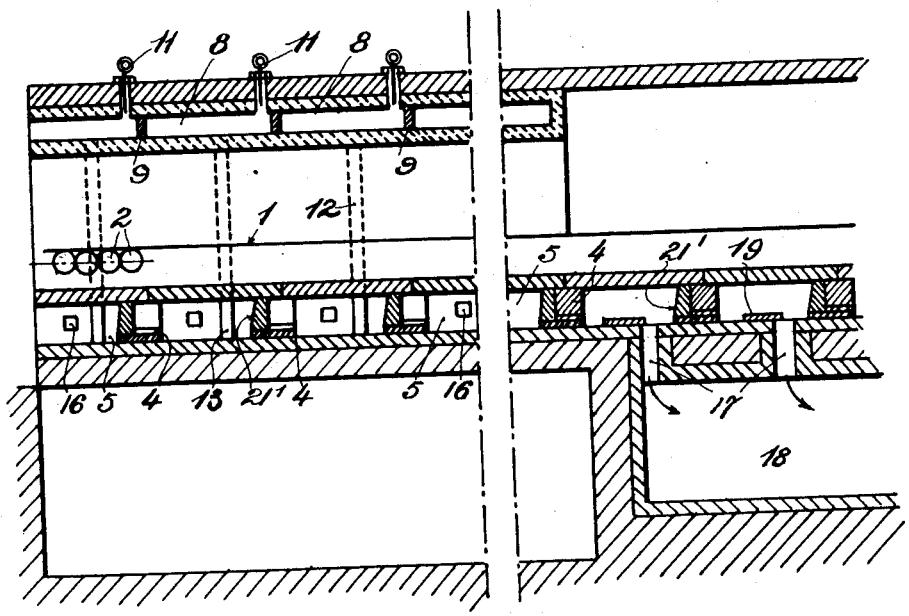
C. Heuze
INVENTOR
By Marks & Clerk
Attys.

Patented Sept. 26, 1933

1,928,254

UNITED STATES PATENT OFFICE 1,928,254

APPARATUS FOR ANNEALING CONTINUOUS SHEETS OF GLASS

Charles Heuze, Auvelais, Belgium, assignor to The American Bicheroux Company, a corporation of Delaware Application October 31, 1927, Serial No. 230,122, and in Belgium December 7, 1926

6 Claims. (Cl. 49—47)

The present invention relates to the annealing of glass and concerns particularly the annealing of glass in the form of sheets, such as those produced in a continuous manner.

Generally speaking the sheet of glass formed by any continuous process reaches the annealing apparatus in a completely unbalanced thermal state. Normally, the temperature of the lower face is lower than the temperature of the upper face, especially on account of the effect of the transporting means, guide rollers, etc., and of the natural tendency for heat to be propagated upwards. Further, the edges of the sheet, the radiating surfaces of which are comparatively larger, are substantially colder than the central part.

In order to insure that the sheet be annealed, it is necessary to raise its temperature to a point above a so called critical annealing temperature, and to maintain such temperature for a certain time, and at the same time to effectively control the reheating temperatures during the entire annealing period.

In order that the annealing may be uniform, the previously existing differences in temperature are to be taken into account as well as the various influences which remain or occur during the annealing process.

In the present reheating methods and the annealing apparatus used, the sheet of glass not only has its lower face in direct contact with the transporting means, but also has its upper surface subjected to the intense radiation from the roof, while the temperatures of its edges are affected by the vicinity of the lateral walls of the annealing apparatus.

The object of the invention is to insure a perfect and uniform annealing of sheets of glass, and especially of the sheets made by a continuous process by simple and effective means, thus avoiding any warping of same.

For this purpose the invention consists mainly in reheating the continuously moving sheet, for the necessary period, so as to act more directly on its colder face, that is, generally, its lower face, the sheet, being disposed as a screen over a heating source so that the heated fluid, occupying the space between the source and the sheet, is caused to lick the lower face and to flow around the lateral edges of the latter and thus reheats the said face and the said edges.

The invention also consists, in the method of reheating in accordance with the preceding paragraph, in controlling the flow of the heated fluid passing around the edges of the sheet, so as to more effectively regulate the reheating of the said edges.

The invention further consists, in the reheating method in accordance with any of the preceding paragraphs, in so conducting the reheating in the successive regions through which the sheet passes, that the latter will be progressively heated at any point up to a temperature above the critical annealing temperature, and then cooled down to the handling temperatures, or in other words, in causing the sheet to pass through successive regions of increasing temperature and then through successive regions of decreasing temperature, the heat in each of such regions being controlled and adjusted at will when necessary, and the heating in each of the said regions being essentially located at the bottom thereof, with however the possibility of extending the heating effects to a greater or less degree to either of the sides or to the top.

In addition to the above mentioned process, the invention includes apparatus suitable for carrying out such process, and particularly the annealing apparatus in which the glass sheets are introduced and conveyed in a continuous manner and which comprise a set of muffle sections each of which has an heating floor located below the lower part thereof, means for supporting and conveying the sheets above the said heating floor so that it will screen the radiated heat and the fluid included between the sheet and the heating floor and heated by the latter; means for conducting and, if required, for controlling the flow of the said fluid to the lateral edges and towards the upper face of the sheet, and means for conducting to any other point of each section a part of the heat produced taken from any heating region.

In order that the invention may be clearly understood, it will now be described in reference to the accompanying drawing, in which:

Fig. 1 is a diagrammatical cross section of a preferred form of annealing apparatus in accordance with the invention, the said section passing on one side through the axis of a burner 16 and on the other side through the axis of a duct 12.

Fig. 2 is a longitudinal and central section of the same apparatus.

In accordance with the above, the annealing apparatus comprises a series of heating sections which, according to a preferred construction, are assembled into a muffle extending along a desired length of the path of the sheet 1, supported and moved by the rollers, guides or other equivalent means 2.

As will be seen, the muffle is not extended throughout the entire length of the annealing apparatus but only through the regions in which the glass is reheated and annealed, operations during which it is necessary to control accurately the temperatures of the sheet.

Below the so called "critical annealing temperatures", the glass undergoes subsequently only a mainly physical treatment, and the variations in the temperature of the sheet do not have to be adjusted with so much accuracy.

The muffle is provided in its lower part with heating chambers 5, separated from each other by walls 4 supporting the refractory floor 3 provided with openings such as 6 and 7 the areas of which are controlled by means of dampers 21¹ operated by suitable means from outside of the apparatus.

The chambers 5 are heated by suitable means, such as burners 16 located at proper points in the side walls of the chambers, and supplied through gas ducts 14 controlled by means of valves 15.

According to one feature of the invention, the draught is downward, the burnt gas escaping by passing mainly through the openings 7 in the successive chambers and through the ducts 17 in the back part of the oven, beyond the muffle, towards a duct 18 communicating with a chimney.

The effective areas of the ducts 17 are adjusted by means of dampers 19 also operated by suitable means from outside the apparatus.

The above mentioned arrangement of burners, ducts and dampers enables the temperatures to be effectively controlled in each of the chambers 5, individually and in the entire muffle, and at any desired point in each particular chamber.

In the upper part of the apparatus above the roof of the muffle, there is provided chambers 8 separated by partitions 9 but communicating with each other through openings such as 10, the areas of which can be modified by the dampers 11.

The said chambers 8 are further preferably connected to the chambers 5 by means of the vertical ducts 12 opening into the latter at 13, said ducts 12 enabling either the introduction of the hot gas into the chambers 8 or to subject the latter to the action of the draught, according to the requirements, so as to be able to effectively control the temperatures of the roof at any point of same and thus controlling its radiation.

The ducts 12 also reduce the cooling effect of the side walls of the apparatus, as will be readily understood.

The ducts 12 can be arranged as shown i. e., a duct 12, opening out between the burner 16 and the transverse wall 4, can be provided in each side wall of the apparatus for each heating chamber, or the communicating ducts 12 can be distributed in staggered relation upon the length of the apparatus so that an upward duct 12 will be located on the other side of the oven approximately opposite a burner 16 in the corresponding chamber 5, so that the fuel gas not used in the said chamber or not discharged through the openings 6 or 7, will rise through the duct 12 and heat the muffle roof, and pass therefrom through the openings 10 to the following muffles of the roof.

Beyond the muffle, where, as above mentioned, it is not necessary to so accurately control the temperatures as in the reheating and annealing sections, the apparatus has only bottom chambers 5 also separated by walls 4 with openings 6 and 7 controlled by dampers 21, the said chambers 5 communicating through the ducts 17 having dampers 19, with the duct 18 leading to the chimney.

The sheet of glass 1, conveyed by the rollers 2, is mainly reheated on its lower face, both by radiation from the floor 3 and by contact with the heated fluid included between the floor and the sheet which, in accordance to the invention, is disposed like a screen above the heat source.

The heated fluid, the natural tendency of which is to rise, bathes the under face of the sheet 1, and moreover cannot escape except by passing and heating the lateral edges of the latter.

In order to effectively adjust the heating of the said edges of the sheet, the flow and the contact of the hot fluid is controlled by placing adjustable baffles 20, hung from the side walls, above the edges of the glass. The baffles can also be fixed, but in such case they are provided with separate ends 21 adapted to be moved towards or away from the sheet as for example through the intermediary of operating rods 22, as shown.

The apparatus being thus arranged, it is clear that the glass can be reheated and annealed according to a predetermined law of temperatures, by compensating for the previously existing differences between the upper and lower faces or between other parts of the sheet, and overcoming the various influences tending to maintain or to increase the said differences in temperature.

The method of operation and the arrangement of the apparatus according to the invention enable a uniform, compensated and perfect anneal of the sheet to be obtained.

Various modifications can be made in the arrangement of the apparatus described and illustrated without departing from the spirit of the invention.

I claim:

1. An apparatus for annealing glass sheets comprising a leer, means for supporting and carrying the sheet in a path in said leer, means for heating a fluid below the sheet path and means requiring such hot fluid to pass around the lateral edges of the sheet path, such means comprising baffles supported above and in the vicinity of the sheet path.

2. An apparatus for annealing glass sheets comprising a leer, means for supporting and carrying the sheet in a path in said leer, means for heating a fluid below the sheet path and means requiring such hot fluid to pass around the lateral edges of the sheet path, such means comprising baffles supported above the sheet path on the side walls of the leer and extending laterally beyond the edges of said sheet path.

3. An apparatus for annealing glass sheets comprising a leer, means for supporting and carrying the sheet in a path in said leer, means for heating a fluid below the sheet path and means for controlling the flow of the heated fluid under the sheet path beyond the lateral edges of the latter, the said means comprising baffles hung from the side walls of the leer and extending over the edges of the sheet path.

4. An apparatus for annealing glass sheets comprising a leer, means for supporting and carrying the sheet in a path in said leer, means for heating a fluid below the sheet path and means for controlling the flow of the heated fluid under the sheet path, beyond the lateral edges of the latter, said means comprising baffles hung from the side walls of the leer and extending over the edges of the sheet path, and movable wings hung at the inner ends of said baffles and means to adjust the distance between the wings and the sheet path.

5. An apparatus for annealing glass sheets comprising a certain number of sections assembled in a muffle, heating chambers in adjustable communication under the floor of the said muffle, the draught being from chamber to chamber towards the rear of the apparatus, beyond the muffle, chambers located above the roof of the muffle and in adjustable communication with each other and with the lower chambers.

6. In an apparatus for annealing glass sheets, comprising a leer, means for supporting and carrying the sheet in said leer, means for heating a fluid below the sheet with means for controlling the escape of the heated fluid from under the sheet and for directing it along the lateral edges of the sheet and locally on the top face of the sheet adjacent said edges only.

CHARLES HEUZE.